(12) United States Patent
George

(10) Patent No.: US 7,221,619 B1
(45) Date of Patent: May 22, 2007

(54) FIBER OPTIC STRAIN GAUGE AND CABLE STRAIN MONITORING SYSTEM FOR MARINE SEISMIC ACQUISITION SYSTEMS

(75) Inventor: Nicholas C. George, Sugar Land, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/349,752

(22) Filed: Feb. 8, 2006

(51) Int. Cl.
*G01V 1/00* (2006.01)
(52) U.S. Cl. .......................... 367/16; 181/110
(58) Field of Classification Search ............... 367/20, 367/16; 181/110
See application file for complete search history.

(56) References Cited

U.S. PATENT DOCUMENTS

| | | | |
|---|---|---|---|
| 5,913,280 A * | 6/1999 | Nielsen et al. ............ | 114/242 |
| 6,018,534 A | 1/2000 | Pan et al. | |
| 6,256,090 B1 * | 7/2001 | Chen et al. ............... | 356/73.1 |
| 6,343,515 B1 | 2/2002 | Dodson | |
| 6,504,792 B2 * | 1/2003 | Barker ....................... | 367/20 |
| 6,885,785 B2 | 4/2005 | Dunphy et al. | |

* cited by examiner

*Primary Examiner*—Mark Hellner
(74) *Attorney, Agent, or Firm*—E. Eugene Thigpen; Richard A. Fagin (57) ABSTRACT

A method for operating a marine seismic survey system includes deploying from a seismic vessel at least two lead-in cables each functionally coupled at one end thereof proximate a respective paravane. The lead-in cables have at least one spreader cable functionally coupled between the paravanes. Strain is measured at least one position along each lead in cable; and a length of each cable is adjusted such that the measured strains are substantially equal.

50 Claims, 4 Drawing Sheets

FIBER OPTIC STRAIN GAUGE AND CABLE STRAIN MONITORING SYSTEM FOR MARINE SEISMIC ACQUISITION SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey systems. More particularly, the invention relates to apparatus for determining strain in lead-in cables used with marine seismic survey systems and methods for using strain measurements from such cables.

2. Background Art

Marine seismic surveying systems are used to acquire seismic data from Earth formations below the bottom of a body of water, such as a lake or the ocean. Marine seismic surveying systems typically include a seismic vessel having onboard navigation, seismic energy source control, and data recording equipment. The seismic vessel is typically configured to tow one or more streamers through the water. At selected times, the seismic energy source control equipment causes one or more seismic energy sources (which may be towed in the water by the seismic vessel or by another vessel) to actuate. Signals produced by various sensors on the one or more streamers are ultimately conducted to the recording equipment, where a record with respect to time is made of the signals produced by each sensor (or groups of such sensors). The recorded signals are later interpreted to infer the structure and composition of the Earth formations below the bottom of the body of water.

The one or more streamers are in the most general sense long cables that have seismic sensors disposed at spaced apart positions along the length of the cable. A typical streamer can extend behind the seismic vessel for several kilometers. Because of the great length of the typical streamer, movement in the water produces a great deal of drag (friction). More recently, marine seismic acquisition systems have been designed that include a plurality of such streamers towed by the seismic vessel in parallel. The streamers are towed by the vessel using towing devices, including cables called "lead-in" cables, and associated equipment that maintain the streamers at selected lateral distances from each other as they are towed through the water.

In combination, the drag produced by the plurality of streamers is quite large, causing the lead-in cables and related towing equipment to undergo considerable stress during survey operations. It is important, for purposes of maintaining the selected lateral distance between the streamers and to reduce the possibility of excessively stressing any one or more of the cables in the towing equipment, among other purposes, to properly distribute the strain on the various lead-in cables. Accordingly there is needed a system for measuring strain in the lead-in cable in order that the strain may be properly distributed among the various lead-in cables.

SUMMARY OF THE INVENTION

A marine seismic acquisition system according to this aspect of the invention includes at least two lead in cables deployable from a seismic vessel. Each lead in cable has at least one strain gauge therein. A paravane is functionally coupled proximate an end of each lead in cable distal from the seismic vessel. At least one spreader cable is coupled between the paravanes. At least one streamer is associated with the lead-in cables and the at least one spreader cable. The at least one streamer has a plurality of seismic sensors thereon as spaced apart locations. The system includes a recording system for detecting signals from the seismic sensors and from the strain gauges.

In one embodiment, the strain gauges are optical fibers having at least one Bragg grating thereon, such that strain on the cable changes periodicity of the grating. Periodicity of the Bragg grating is determined by measuring change in wavelength of light backscattered by the Bragg grating.

In one embodiment, the recording system includes means for measuring peak strain on the strain gauges.

In one embodiment, each lead-in cable includes a plurality of strain gauges at spaced apart locations, such that strain distribution along each lead-in cable can be determined.

Another aspect of the invention is a method for operating a marine seismic survey system. A method for operating a marine seismic survey system according to this aspect includes deploying from a seismic vessel at least two lead-in cables each functionally coupled at one end thereof proximate a respective paravane. The lead-in cables have at least one spreader cable functionally coupled between the paravanes. Strain is measured at least one position along each lead in cable; and a length of each cable is adjusted such that the measured strains are substantially at a selected value.

A method for operating a marine seismic acquisition system according to another aspect of the invention includes deploying a lead-in cable from seismic vessel. The lead-in cable is coupled at an end distal from the seismic vessel to a seismic sensor streamer. The method includes recording at least one of a peak strain and a parameter related to a product of strain and deployment time at least one position along the lead-in cable. In some embodiments, an indication is generated that the affected cable should be removed from service when the peak strain or the parameter exceeds a selected threshold.

Other aspects and advantages of the invention will be apparent from the following description and the appended claims.

DETAILED DESCRIPTION

Figure 1:
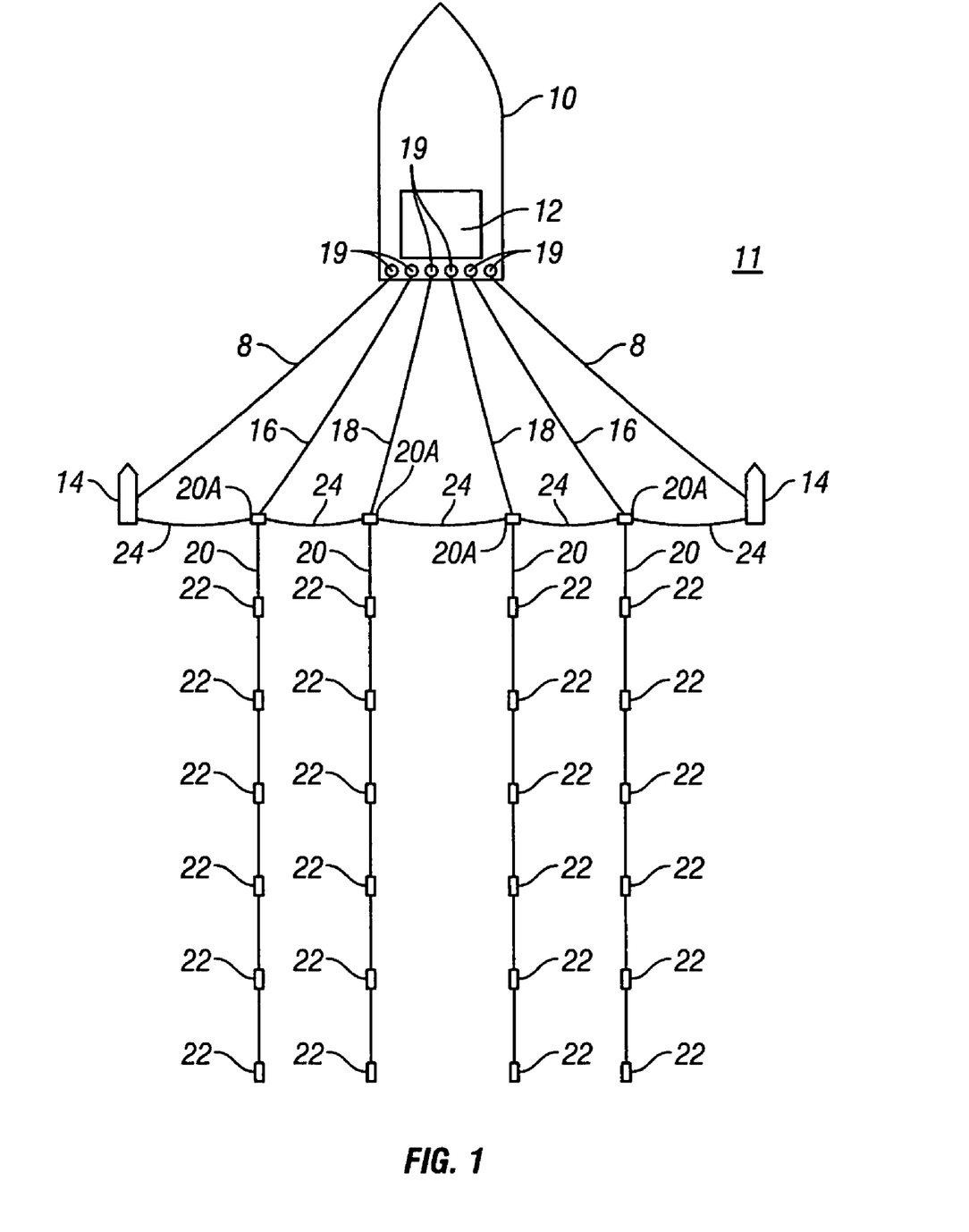
FIG. 1 shows a plan view of a typical marine seismic survey system that can include one or more seismic cables according to the invention.

FIG. 1 shows a typical marine seismic survey system that can include one or more cables having strain gauges therein. The acquisition system includes a seismic vessel 10 that moves along the surface of a body of water 11 such as a lake or the ocean. The seismic vessel 10 may include thereon equipment, shown at 12 and for convenience collectively called a "recording system." The recording system 12 typically includes a recording unit for making a record with respect to time of signals generated by various seismic sensors in the acquisition system. The recording system 12 also typically includes navigation equipment to determine at any time the position of the vessel 10 and each of a plurality of seismic sensors 22 disposed at spaced apart locations on streamers 20 towed by the vessel 10. The foregoing elements of the recording system 12 are familiar to those skilled in the art and are not shown in the Figures for clarity of the illustration.

The seismic sensors 22 can be any type of seismic sensor known in the art such as motion responsive sensors, acceleration sensors, pressure sensors, pressure time gradient sensors or any combination thereof. The seismic sensors 22 measure seismic energy primarily reflected from various structures in the Earth's subsurface below the bottom of the water 11. The seismic energy originates from a seismic energy source (not shown) deployed in the water 11. The recording system 12 may also include seismic energy source control equipment (not shown separately). One or more seismic energy sources (not shown in the Figures for clarity) may be towed by the seismic vessel 10 or by another vessel (not shown) nearby.

In the seismic data acquisition system shown in FIG. 1, there are four seismic sensor streamers 20 towed by the seismic vessel 10. The number of seismic sensor streamers may be different in any particular implementation of an acquisition system according to the various aspects of the invention, therefore, the number of streamers shown in FIG. 1 is not intended to limit the scope of the invention. As explained in the Background section herein, in seismic acquisition systems such as shown in FIG. 1 that include a plurality of laterally spaced apart streamers, the streamers 20 are coupled to towing equipment that maintains the streamers 20 at selected lateral positions with respect to each other and with respect to the seismic vessel 10. As shown in FIG. 1, the towing equipment can include two paravane tow ropes 8 each coupled to the vessel 10 at one end through a winch 19 or similar spooling device that enables changing the deployed length of each paravane tow rope 8. The distal end of each paravane tow rope 8 is functionally coupled to a paravane 14. The paravanes 14 are each shaped to provide a lateral component of motion to the various towing components deployed in the water 11 when the paravanes 14 are towed in the water 11. Lateral in the present context means transverse to the direction of motion of the vessel 10. The lateral motion component of each paravane 14 is opposed to that of the other paravane 14, and is generally in a direction outward from the centerline of the vessel 10. The combined lateral motion of the paravanes 14 separates the paravanes 14 from each other until they put one or more spreader ropes or cables 24, functionally coupled end to end between the paravanes 14, into tension.

As used in the present description, the term "cable" means a device that includes one or more electrical and/or optical conductors therein for carrying electrical power and/or signals from the vessel 10 to and/or from various components of the seismic acquisition system. A cable as used in the present context may also include various forms of armor or other device to carry axial loading along the cable, and thus may be a load bearing part of the acquisition system. The term "rope" is used in the present description to refer to a flexible, axial load carrying member that does not include any form of electrical and/or optical conductor, and as such is used essentially only to carry axial loading. The distinction is made between ropes and cables here for accuracy of the description. In typical multiple-streamer acquisition systems, such as shown in FIG. 1, the laterally outermost towing elements, the paravane tow ropes 8 are in fact typically ropes. However, such configuration is not meant to limit the scope of this invention. Other embodiments within the scope of this invention may provide cables at the laterally outermost towing positions coupled to the paravanes 14 as shown in FIG. 1. Such cables may include axial and/or bending strain gauges as will be further explained below.

The streamers 20 are each coupled, at the axial ends thereof nearest the vessel 10, to a respective lead-in cable termination 20A. The lead-in cable terminations 20A are coupled to or are associated with the spreader ropes or cables 24 so as to fix the lateral positions of the streamers 20 with respect to each other and with respect to the vessel 10. Electrical and/or optical connection between the appropriate components in the recording system 12 and, ultimately, the sensors (and/or other circuitry) in the ones of the streamers 20 inward of the lateral edges of the system may be made using inner lead-in cables 18, each of which terminates in a respective lead-in cable termination 20A. A lead-in termination 20A is disposed at the vessel end of each streamer 20. Corresponding electrical and/or optical connection between the appropriate components of the recording unit 12 and the sensors in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed.

As will be readily appreciated by those skilled in the art, the actual lateral separation between the streamers 20 is related to the tension on the spreader ropes or cables 24. Accordingly, one aspect of the invention, explained in more detail below, includes a method and apparatus for maintaining selected tension on the spreader cable 24 so that the lateral spacing between the streamers 20 is maintained.

When tension on the paravane tow ropes 8, the outermost lead-in cables 16 and the inner lead in cables 18 are at selected values, and when there are no substantial disturbances in the water 11 or the motion of the vessel 10, the paravane tow ropes 8, the outermost lead in cables 16, the inner lead in cables 18, the paravanes 14 and the spreader cable 24 are essentially in tensile equilibrium, such that the preferred relative positions of the paravanes 14 with respect to the vessel 10 are maintained. Thus, the expected lateral positions of the streamers 20 with respect to each other and with respect to the vessel 10 are maintained as well.

In some embodiments, and in particular when the paravane tow ropes 8 are in fact ropes as herein defined, the tension on each of the paravane tow ropes 8 can be measured by cable tension sensors known in the art, including a sensor (not shown separately) for measuring a torque exerted on the winch 19, or a sensor (not shown separately) for measuring force needed to deflect the tow ropes 8 a certain amount laterally. See, for example, U.S. Pat. No. 6,343,515 issued to Dodson. In such embodiments the amount of tension on the paravane tow ropes 8 can be assumed to be substantially equal to the tension as measured at or near the corresponding winch 19.

The outer lead-in cables 16 and the inner lead-in cables 18, however, may have axial tension on them that is considerably different than the tension that would be measured at the corresponding winch 19. Such differences between measured tension and actual tension arise because of catenary effects from indirect coupling of the lead-in cables 16, 18 to the paravanes 14, among other factors. In any event, methods known in the art prior to the present invention for deploying the lead-in cables 16, 18 included having the system operator control the winches 19 to extend the lead-in cables 16, 18 until the deployment of the system components appeared to be correct, based on observation.

Figure 2:
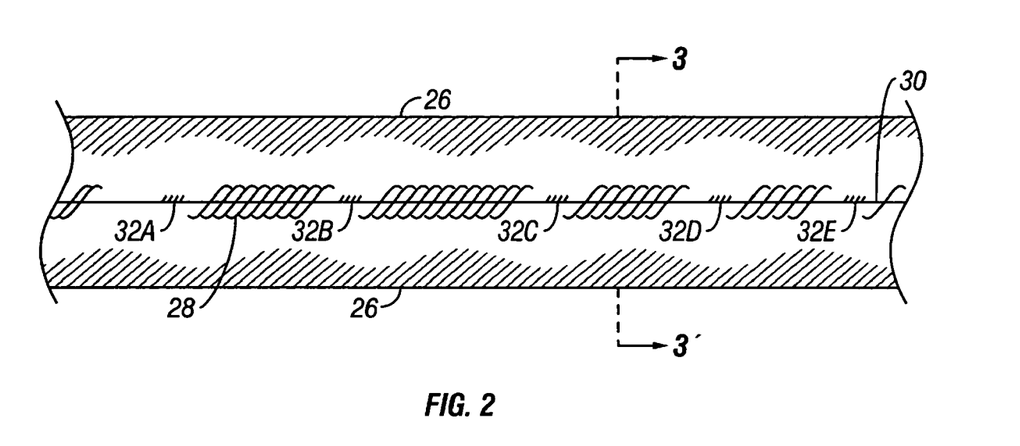
FIG. 2 shows a cut away view of one embodiment of a cable according to the invention.

In the present embodiment, each of the lead-in cables 16, 18 can include one or more axial strain gauges, which preferably are optical strain gauges and which will be explained further herein with reference to FIGS. 2 and 3. FIG. 2 shows a cut away view of one embodiment of an outermost lead-in cable 16 according to the invention. The outermost lead-in cable 16 preferably includes one or more layers of armor 26, which may be formed from steel wires helically wrapped around the centerline of the cable 16. Typically a lead-in cable will include two, three or four layers of such armor 26, each layer helically wound in a lay direction opposed to the underlying or overlying armor layer so that torque induced on the cable 16 under axial strain will be reduced. The armor 26 may be galvanized or made from corrosion resistant alloy to reduce effects of exposure to the water (11 in FIG. 1). The cable 16 typically includes a conductor "core", shown generally at 28, that can include, a plurality of insulated electrical conductors and in some embodiments optical fibers, to carry electrical power from the recording system (12 in FIG. 1) to various acquisition system components deployed in the water (11 in FIG. 1), and to carry signals from the sensors (22 in FIG. 1) in electrical or optical telemetry format to the recording system (12 in FIG. 1). The various elements of the conductor core 28 are typically helically wound, so that axial elongation of the cable 16 does not produce substantial corresponding axial strain in the elements of the conductor core 28.

In the present embodiment, the lead-in cable 16 includes an optical fiber 30 disposed in the center of the core 28. Locating the optical fiber 30 in the center of the core 28 may be preferred to reduce the risk of damage to the optical fiber 30 during handling, deployment and use, and to reduce the effect of any tension induced torque on the cable 16 that may affect the length of the optical fiber 30. For purposes of the invention, it is only necessary to place the optical fiber 30 within the cable 16 so that elongation of the cable 16 under axial tension is effectively directly communicated to the optical fiber 30.

The optical fiber 30 includes at least one, and preferably a plurality of Bragg gratings, shown at 32A, 32B, 32C, 32D, 32E. If a plurality of Bragg gratings is used on the optical fiber 30, each such Bragg grating preferably has a different grating periodicity, or wavelength. As will be explained below with reference to FIG. 4, broadband light may be applied to the optical fiber 30 at one end thereof, typically from the seismic vessel end. As the cable 16 is elongated under axial tension, the Bragg gratings 32A, 32B, 32C, 32D, 32E will be correspondingly elongated, thus changing the periodicity of each Bragg grating (spacing between the elements of the grating). As a result, the wavelength of light that is backscattered by each Bragg grating will be correspondingly changed. Thus, a measurement corresponding to the strain on the cable 16 can be made at one or more individual positions along the cable 16 by measuring wavelength of the backscattered light. Such measurements can be used, as will be further explained below, to determine the state of deployment of the various components of the acquisition system in the water (11 in FIG. 1), to determine the existence of obstructions to motion, and to monitor the strain history of the cable 16. In some embodiments, the Bragg gratings may be included only on the portions of the cable 16 that are expected to be deployed from the winch (19 in FIG. 1).

Figure 3:
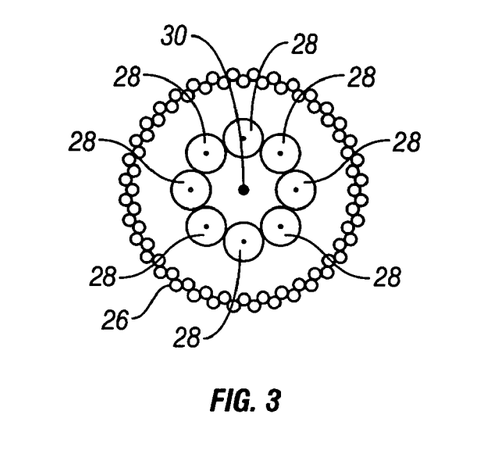
FIG. 3 shows a cross section of the cable shown in cut away view in FIG. 2.

A cross section of the cable 16 is shown in FIG. 3, including the fiber 30, the insulated electrical conductors in the conductor core 28, and the armor 26.

Figure 4:
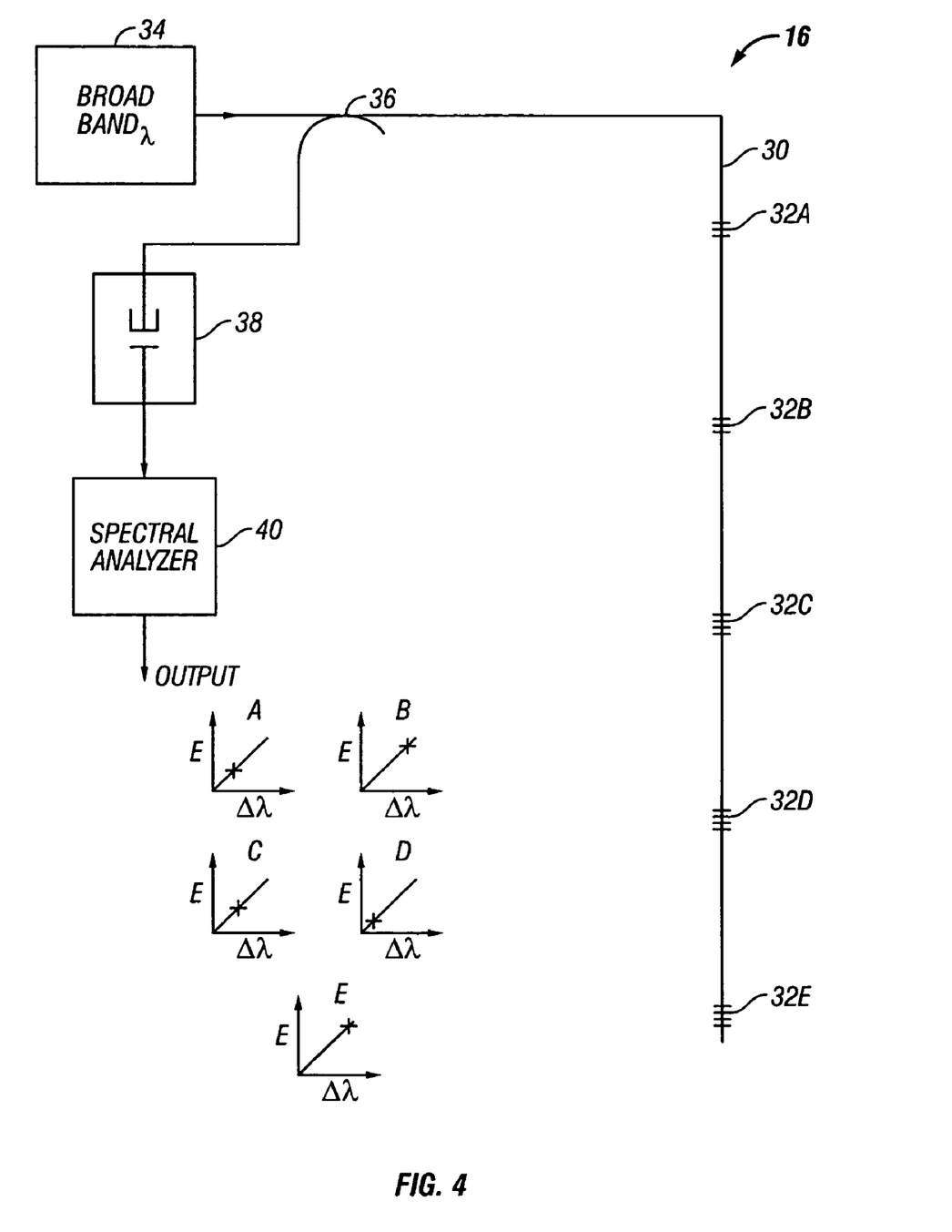
FIG. 4 shows an axial strain monitoring system using the optical fiber disposed in the cable shown in FIGS. 2 and 3.

One embodiment of a strain monitoring system is shown schematically in FIG. 4. A broadband light source 34, such as a laser diode, may be disposed in or near the recording system (12 in FIG. 1) or other convenient location on the vessel (10 in FIG. 1) so as to apply broadband light to one input of an optical coupling 36. One output of the optical coupling 36 is coupled to one end of the optical fiber 30. The broadband light travels along the optical fiber 30. At each Bragg grating 32A, 32B, 32C, 32D, 32E on the optical fiber 30, some of the broadband light is backscattered along the optical fiber 30. The wavelength of the light backscattered by each Bragg grating will be related to the periodicity of each Bragg grating 32A, 32B, 32C, 32D, 32E. As explained above with reference to FIG. 2, each Bragg grating preferably has a different periodicity from the other Bragg gratings under no-strain conditions, and such periodicities are preferably sufficiently different from each other that the backscattered light may be individually identified to each Bragg grating.

In the present embodiment, a photodetector 38 may be coupled to one input of the optical coupling 36 to detect the backscattered light from the optical fiber 30. The photodetector 38 and optical coupling 34 may form part of the recording system (12 in FIG. 1). The output of the photodetector 38 may be coupled to a spectral analyzer 40 (which may also form part of the recording system) so that the wavelength of the backscattered light may be monitored. As shown in the graphs in FIG. 4, at A, B, C, D, E, each corresponding to a respective Bragg grating 32A, 32B, 32C, 32D, 32E, change in wavelength of the backscattered light, shown on the coordinate axes as $\Delta\lambda$ corresponds to cable elongation, or axial strain, at each Bragg grating, shown at $\epsilon$. Generally elongation will be linearly related to change in wavelength of the backscattered light, however it will be appreciated by those skilled in the art that any non-linear relationship therebetween may be readily characterized. In some embodiments, it may be desirable to include at least one Bragg grating (not shown in the Figures) on the same or a different optical fiber that is arranged to be completely isolated from axial strain on the cable (16 in FIG. 1). Such additional Bragg grating, isolated from axial strain on the cable, may be used to normalize the wavelength measurements from each of the strain-coupled Bragg gratings for changes in ambient temperature on the cable (16 in FIG. 2). By providing a Bragg grating at one or more selected positions along the cable (16 in FIG. 1) and by determining change in periodicity of the one or more Bragg gratings by determining change in wavelength of backscattered light, a measurement corresponding to axial strain can be made at one or more positions along the cable (16 in FIG. 1). By including a plurality of such Bragg gratings as explained above, individual measurements of strain at selected positions along the cable (16 in FIG. 1), and thus the strain distribution along the cable, can be determined. While the foregoing description is directed to the outermost lead-in cables (16 in FIG. 1) the structure and principle of operation may be equally applied to the inner lead-in cables (18 in FIG. 1), and as will be explained below, to the spreader cable (24 in FIG. 1). In some embodiments of an acquisition system, the paravane tow ropes (8 in FIG. 1) may in fact be cables, and may include optical strain gauges substantially as explained with reference to FIGS. 2 and 3.

Figure 5:
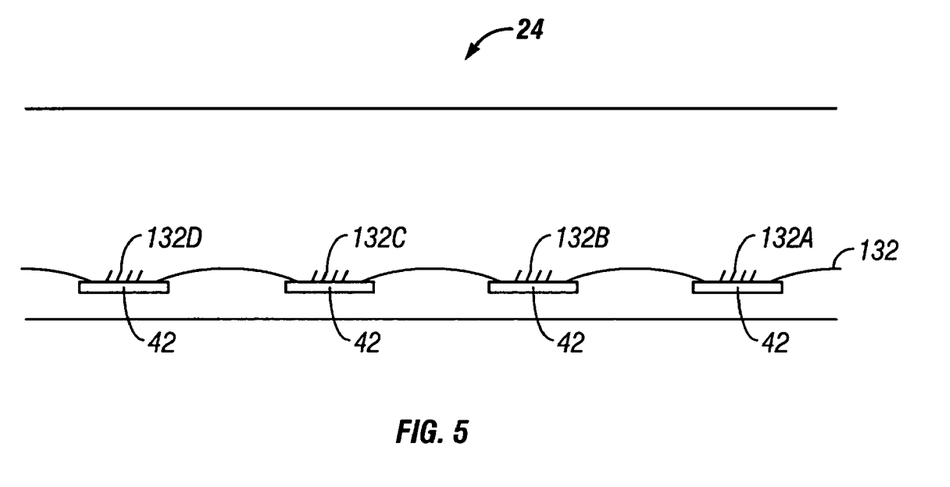
FIG. 5 shows another embodiment of a seismic system cable having an optical fiber arranged to deform correspondingly to bending strain along the cable.

FIG. 5 shows another embodiment of a cable, such as the spreader cables 24, that can include a fiber optic strain gauge for detecting lateral stress (bending) on the cable. An optical fiber 132 similar to the optical fiber shown at 30 in FIG. 2 may be disposed within the spreader cable 24 in such a manner that axial strain on the spreader cable 24 does not substantially affect the length of the optical fiber 132. The optical fiber 132 has at least one, and preferably a plurality of Bragg gratings thereon, as shown at 132A, 132B, 132C, 132D. The optical fiber 132 at each grating thereon can be affixed to, such as by suitable adhesive or clamping between plates of material, to a spring steel member 42 or similar element that will correspondingly laterally deform as bending stress is applied to the spreader cables 24, but not beyond the elastic limit of the member 42. Spring steel is a material that can undergo considerable bending stress without plastic deformation, and is therefore suitable for use as the member 42. Bending of the spring steel member 42 is thus transferred to the optical fiber 132 to change the periodicity of each Bragg grating 142A, 142B, 142C, 142D. Detection of changes in periodicity of the Bragg gratings can be performed using an optical system substantially as explained above with reference to FIG. 4. The spreader cables 24 may or may not include electrical and/or optical conductors as do the lead-in cables (16, 18 in FIG. 1) depending on the particular system configuration.

The bending strain gauge shown in FIG. 5 may be used separately from the axial strain gauge explained with reference to FIG. 2 in some embodiments of a lead-in cable, or both axial and bending strain devices may be used in some embodiments of a lead in cable. The spreader cables 24 may also include both axial strain gauges, substantially as explained above with reference to FIG. 2, and bending strain gauges as explained above with reference to FIG. 5. A specific purpose for having one or more bending strain gauges in the spreader cables will be explained further below.

Referring once again to FIG. 1, when the streamers 20, lead-in cables 16, 18 and spreader cables 24 are deployed in the water 11, axial (and, in some embodiments, bending) strain and/or strain distribution along each outermost lead-in cable 16 and on each inner lead-in cable 18 can be monitored during survey operations using a measuring and monitoring system substantially as explained with reference to FIG. 4. Similarly, axial and/or bending strain and/or strain distribution may be monitored along any one or more of the spreader cables 24. Measurements corresponding to the amount of cable strain measured at each Bragg grating may be displayed and/or recorded by the recording system 12.

In a method according to one aspect of the invention, strain at least one position, and preferably at a plurality of positions along at least each outermost lead-in cable 16 is monitored, and corresponding ones of the winches 19 that deploy the respective outermost lead-in cables 16 are operated to adjust the length thereof so that the strain or strain distribution along each outermost lead-in cable 16 is substantially equal to that along the other outermost lead-in cable 16. In some embodiments, the amount of axial strain on each outermost lead-in cable 16 may adjusted to a selected or predetermined value, so as to carry a selected portion of the total towing load on the acquisition system. In other embodiments, axial strain may be measured on each of the inner lead-in cables 18, and the corresponding winches 19 may be operated such that the axial strain on each inner lead-in cable 18 is substantially equal. In some embodiments, the axial strain on each inner lead-in cable 18 may be adjusted to a selected or predetermined value such that the inner lead-in cables 18 carry a selected portion of the total towing load on the acquisition system. In such embodiments, the winches 19 may be automatically adjusted under control of the recording system 12 such that the preferred value of axial strain (or strain distribution) on each cable 16, 18 is maintained.

In some embodiments, axial strain and/or strain distribution may also be measured along one or more of the spreader cables 24. In such embodiments, the deployed length of each paravane tow rope 8, of each outermost lead in cable 16 and of each inner lead-in cable 18 can be adjusted such that a selected amount of axial strain may be applied to the each of the spreader cables 24. Thus, a preferred geometry of all the ropes 8 and cables 16, 18, 24 may be maintained so as to optimize the geometry of the acquisition system components deployed in the water 11.

In some embodiments, the recording system 12 may include separate control elements (not shown) to operate the winches 19 to automatically adjust the length of each rope 8 and each lead-in cable 16, 18 to provide selected strain and/or strain distribution along the lead-in cables 16, 18 and/or the spreader cables 24.

In some embodiments, the paravane tow ropes 8 may each include one or more optical axial strain gauges made as explained with reference to FIG. 2. In such embodiments, tension on the tow ropes 8 may be measured substantially as explained with reference to FIG. 4.

In another aspect of a method according to the invention, a maximum value of strain at each measuring position (at each respective Bragg grating) may be monitored and recorded in the recording system 12. If a value of peak strain exceeds a selected threshold during operation, the recording system 12 may be programmed to produce an indication thereof that the affected cable may require removal from service for safety reasons. The system operator may elect to remove the affected cable from service. Similarly, the recording system 12 may be programmed to record the product, or similar function, of peak or average strain and total deployment time at each measuring position along each cable. When a value of the product exceeds a selected threshold for any one or more measuring positions, the recording system may generate a warning or similar indication to inform the system operator that the affected cable may be removed from service.

Measurements of axial and/or bending strain may also be used to inform the system operator that an obstruction to motion may be affecting one or more of the cables in the water 11.

As explained with reference to FIG. 5, some embodiments of a cable according to the invention may include lateral strain gauges. In a particular embodiment, lateral strain may be measured at least one position, and preferably at a plurality of spaced apart locations along at least one of the spreader cables 24 using bending-sensitive optical strain gauges as explained above. In such embodiments, the winches 19 may be operated to adjust the length of each lead-in cable 16, 18 such that bending strain on the at least one spreader cables 24 is minimized. Such winch operation may in some embodiments be performed automatically by suitable equipment (not shown separately) in the recording system 12 or otherwise disposed on the vessel 10.

The foregoing aspects of the invention have been explained with reference to a seismic acquisition system using a plurality of laterally spaced apart streamers. In other implementations, one or more aspects of the invention may be applicable to single-streamer acquisition systems. Such systems include a single lead in cable deployed from the back of a seismic vessel, and one streamer substantially as explained above. In such single streamer embodiments, the lead in cable may be made substantially as explained with reference to FIG. 2 (axial strain), and/or FIG. 5 (bending strain) and strain thereon may be monitored as explained with reference to FIG. 4. In such single-streamer embodiments, peak strain may be monitored and recorded to indicate excessive strain as explained above, to indicate excessive fatigue (product of strain and time as explained above), or to infer the presence of motion obstructions as explained above.

Seismic acquisition systems according to the various aspects of the invention may provide improved system operation by the ability to optimize deployment geometry, may improve system safety by alerting the system operator to excessive strain applied to one or more system components, and my reduce the incidence of unexpected cable failure by reason of undetermined excessive fatigue on such cable. Advantageously, a system made using optical strain gauges, in particular Bragg grating strain gauges as explained herein, may provide for a great number of strain gauges positionable along the various cables without introducing any additional electrical components to the cables, and without the need for any additional electrical and/or optical coupling components in the cables.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a marine seismic survey system, comprising:
   deploying from a seismic vessel at least two lead-in cables each functionally coupled at one end thereof proximate a respective paravane, the lead-in cables having at least one spreader cable functionally coupled between the paravanes;
   measuring strain at least one position along each lead in cable; and
   adjusting a length of each lead in cable such that the measured strains are substantially equal.

2. The method of claim 1 further comprising measuring strain at least one position along the at least one spreader cable, and adjusting a length of both lead-in cables until the strain measured along the spreader cable is at a selected value.

3. The method of claim 1 further comprising measuring strain at a plurality of selected positions along each lead-in cable, and adjusting a length of each lead-in cable such that strain distribution along each lead-in cable is substantially equal.

4. The method of claim 3 further comprising determining existence of an obstruction to movement of the seismic system when strain measured at least one position exceeds a selected threshold.

5. The method of claim 1 further comprising measuring a peak value of strain on each lead-in cable, and generating a signal to indicate removal from service such one of the lead-in cables wherein the peak value of strain exceeds a selected threshold.

6. The method of claim 1 further comprising recording strain on at least one lead in cable with respect to time, and generating a signal to indicate removal from service of the at least one lead in cable when a product of strain and time exceeds a selected threshold.

7. The method of claim 1 wherein the measuring strain comprises measuring axial strain.

8. The method of claim 1 wherein the measuring strain comprises determining a wavelength of backscattered light in an optical fiber having a Bragg grating thereon.

9. The method of claim 1 further comprising measuring a bending strain at least one position along the spreader cable, and adjusting a length of at least one inner lead-in cable disposed laterally inwardly from the at least two lead-in cables and coupled at a distal end thereof to the spreader cable until the measured bending strain falls below a selected threshold.

10. A marine seismic acquisition system, comprising:
    at least two lead in cables deployable from a seismic vessel, each lead in cable having at least one strain gauge therein;
    a paravane functionally coupled proximate an end of each lead in cable distal from the seismic vessel;
    at least one spreader cable coupled between the paravanes;
    a streamer associated with at least one of the lead-in cables and the spreader cable, the at least one streamer having a plurality of seismic sensors thereon as spaced apart locations;
    a recording system for detecting signals from the seismic sensors and from the strain gauges;
    means for adjusting a length of each lead-in cable; and
    means for monitoring strain on each lead-in cable, a length of each lead-in cable adjustable by the means for adjusting such that strain on each lead-in cable is substantially equal.

11. The system of claim 10 wherein the strain gauges comprise optical strain gauges.

12. The system of claim 11 wherein the optical strain gauges each comprise an optical fiber having a Bragg grating thereon, the fiber coupled to the lead-in cable such that strain on the lead-in cable changes a periodicity of the Bragg grating.

13. The system of claim 10 further comprising a plurality of strain gauges at spaced apart locations along each lead-in cable.

14. The system of claim 13 wherein the strain gauges comprise optical strain gauges.

15. The system of claim 14 wherein the optical strain gauges each comprise an optical fiber having a Bragg grating thereon, the fiber coupled to the lead-in cable such that strain on the lead-in cable changes a periodicity of the Bragg grating.

16. The system of claim 10 further comprising at least one strain gauge in the spreader cable.

17. The system of claim 16 wherein the at least one strain gauge in the spreader cable comprises an optical strain gauge.

18. The system of claim 17 wherein the optical strain gauge in the spreader cable comprises an optical fiber having a Bragg grating thereon, the fiber coupled to the spreader cable such that strain on the cable changes a periodicity of the Bragg grating.

19. The system of claim 18 further comprising means for adjusting a length of each lead-in cable, and means for monitoring strain on the spreader cable, a length of each lead-in cable adjustable by the means for adjusting such that strain on the spreader cable substantially matches a selected value.

20. The system of claim 17 further comprising means for monitoring a peak value of strain on the spreader cable, the means for monitoring including means for generating an indicator to remove the spreader cable from service when the peak value of strain exceeds a selected threshold.

21. The system of claim 17 further comprising means for determining a product of strain on the spreader cable and time, the means for determining including means for generating an indicator to remove the spreader cable from service when the product exceeds a selected threshold.

22. The system of claim 10 further comprising means for determining a product of strain on each of the lead-in cables and time, the means for determining including means for generating an indicator to remove from service such one of the lead-in cables wherein the product exceeds a selected threshold.

23. The system of claim 10 further comprising means for monitoring a peak value of strain on each lead-in cable, the means for monitoring including means for generating an indicator to remove from service such one of the lead-in cables wherein the peak value of strain exceeds a selected threshold.

24. The system of claim 10 wherein the strain gauges comprise axial strain gauges.

25. The system of claim 24 wherein the strain gauges comprise optical strain gauges.

26. The system of claim 25 wherein the optical strain gauges each comprises an optical fiber having a Bragg grating thereon, the fiber coupled to the lead-in cable such that strain on the cable changes a periodicity of the Bragg grating.

27. The system of claim 10 further comprising at least one bending strain gauge arranged to respond to bending strain in the spreader cable, the system further comprising at least one inner lead-in cable coupled between the vessel and the spreader cable, and means for adjusting a length of the at least one inner lead in cable in response to measurements from the bending strain gauge.

28. The system of claim 27 wherein the at least one bending strain gauge comprises an optical strain gauge.

29. The system of claim 28 wherein the optical strain gauge comprises an optical fiber having a Bragg grating thereon, the fiber coupled to the spreader cable such that ending strain on the cable changes a periodicity of the Bragg grating.

30. A method for operating a marine seismic acquisition system, comprising:
deploying a lead-in cable from seismic vessel, the lead-in cable coupled at an end distal from the seismic vessel to a sensor streamer;
recording at least one of a peak strain and a parameter related to a product of strain and deployment time at least one position along the lead-in cable; and
generating an indicator to remove the lead-in cable from service when the at least one of the peak strain and the parameter exceeds a selected threshold.

31. The method of claim 30 wherein the strain is measured by measuring change in wavelength of backscattered light in an optical fiber.

32. The method of claim 31 wherein the optical fiber includes a Bragg grating thereon and the strain is coupled to the fiber such that periodicity of the Bragg grating changes correspondingly with the strain.

33. The method of claim 30 wherein the strain comprises axial strain.

34. The method of claim 30 wherein the strain comprises bending strain.

35. A method for deploying a marine seismic acquisition system, comprising:
deploying from a seismic vessel an array including at least two paravane tow ropes each functionally coupled to a paravane at an end thereof distal from the vessel, the array including at least two lead in cables each coupled to a seismic streamer at an end thereof distal from the vessel, the lead in cables laterally interior to the tow ropes;
measuring axial strain on each lead in cable; and
adjusting a length of at least the lead in cables such that the measured axial strain thereon is at a selected value.

36. The method of claim 35 wherein the measuring strain comprises determining a wavelength of backscattered light in a fiber having a Bragg grating thereon.

37. The method of claim 35 further comprising measuring axial strain on each tow rope, and adjusting a length of the tow ropes and a length of the lead in cables such that each of the tow ropes and the lead in cables has a selected value of axial strain thereon.

38. The method of claim 37 wherein the measuring axial strain on the tow ropes comprises measuring torque on a winch used to deploy each tow rope.

39. A marine seismic acquisition system, comprising:
at least two lead in cables deployable from a seismic vessel, each lead in cable having at least one strain gauge therein;
a paravane functionally coupled proximate an end of each lead in cable distal from the seismic vessel;
at least one spreader cable coupled between the paravanes;
a streamers associated with at least one of the lead-in cables and the spreader cable, the at least one streamer having a plurality of seismic sensors thereon as spaced apart locations;
a recording system for detecting signals from the seismic sensors and from the strain gauges; and
means for monitoring a peak value of strain on the spreader cable, the means for monitoring including means for generating an indicator to remove the spreader cable from service when the peak value of strain exceeds a selected threshold.

40. The system of claim 39 wherein the strain gauges comprise optical strain gauges.

41. The system of claim 40 wherein the optical strain gauges each comprise an optical fiber having a Bragg grating thereon, the fiber coupled to the lead-in cable such that strain on the lead-in cable changes a periodicity of the Bragg grating.

42. The system of claim 39 further comprising a plurality of strain gauges at spaced apart locations along each lead-in cable.

43. The system of claim 42 wherein the strain gauges comprise optical strain gauges.

44. The system of claim 43 wherein the optical strain gauges each comprise an optical fiber having a Bragg grating thereon, the fiber coupled to the lead-in cable such that strain on the lead-in cable changes a periodicity of the Bragg grating.

45. A marine seismic acquisition system, comprising:
at least two lead in cables deployable from a seismic vessel, each lead in cable having at least one strain gauge therein;
a paravane functionally coupled proximate an end of each lead in cable distal from the seismic vessel;
at least one spreader cable coupled between the paravanes;
a streamer associated with at least one of the lead-in cables and the spreader cable, the at least one streamer having a plurality of seismic sensors thereon as spaced apart locations;
a recording system for detecting signals from the seismic sensors and from the strain gauges; and
means for monitoring a peak value of strain on each lead-in cable, the means for monitoring including means for generating an indicator to remove from service such one of the lead-in cables wherein the peak value of strain exceeds a selected threshold.

46. The system of claim 45 wherein the strain gauges comprise optical strain gauges.

47. The system of claim 46 wherein the optical strain gauges each comprise an optical fiber having a Bragg grating thereon, the fiber coupled to the lead-in cable such that strain on the lead-in cable changes a periodicity of the Bragg grating.

48. The system of claim 45 further comprising a plurality of strain gauges at spaced apart locations along each lead-in cable.

49. The system of claim 48 wherein the strain gauges comprise optical strain gauges.

50. The system of claim 49 wherein the optical strain gauges each comprise an optical fiber having a Bragg grating thereon, the fiber coupled to the lead-in cable such that strain on the lead-in cable changes a periodicity of the Bragg grating.

* * * * *